(12) United States Patent
Akiyama (10) Patent No.: US 9,167,637 B2
(45) Date of Patent: Oct. 20, 2015

(54) LED DRIVE CIRCUIT

(71) Applicants: CITIZEN HOLDINGS CO., LTD., Tokyo (JP); CITIZEN ELECTRONICS CO., LTD., Yamanashi (JP)

(72) Inventor: Takashi Akiyama, Saitama (JP)

(73) Assignees: CITIZEN HOLDINGS CO., LTD., Tokyo (JP); CITIZEN ELECTRONICS CO., LTD., Yamanashi (JP)

( * ) Notice: Subject to any disclaimer, the term of this patent is extended or adjusted under 35 U.S.C. 154(b) by 0 days.

(21) Appl. No.: 14/384,386

(22) PCT Filed: Mar. 14, 2013

(86) PCT No.: PCT/JP2013/057261
§ 371 (c)(1),
(2) Date: Sep. 10, 2014

(87) PCT Pub. No.: WO2013/137410
PCT Pub. Date: Sep. 19, 2013

(65) Prior Publication Data
US 2015/0115810 A1     Apr. 30, 2015

(30) Foreign Application Priority Data
Mar. 16, 2012    (JP) ................................ 2012-060105

(51) Int. Cl.
*H05B 37/02* (2006.01)
*H05B 33/08* (2006.01)

(52) U.S. Cl.
CPC .......... *H05B 33/0803* (2013.01); *H05B 33/083* (2013.01); *H05B 33/0812* (2013.01); *H05B 33/0824* (2013.01)

(58) Field of Classification Search
CPC .......................... H05B 33/083; H05B 33/0824
USPC ........... 315/312, 326, 209 R, 185 S, 291, 307
See application file for complete search history.

(56) References Cited

U.S. PATENT DOCUMENTS 7,847,486 B2 * 12/2010 Ng ................................ 315/119
2009/0021185 A1    1/2009 Ng (Continued)

FOREIGN PATENT DOCUMENTS

JP    H11-307815 A    11/1999
JP    2008-509523 A    3/2008

(Continued)

OTHER PUBLICATIONS

International Search Report for International Patent Application No. PCT/JP2013/057261, Apr. 16, 2013.
International Preliminary Report on Patentability for PCT/JP2013/057261, Dec. 3, 2013.

*Primary Examiner* — Douglas Owens
*Assistant Examiner* — Borna Alaeddini (57) ABSTRACT

An LED drive circuit includes: a rectifier circuit that outputs a full-wave rectification waveform voltage; a primary LED row that includes a first partial LED row and a second partial LED row; an auxiliary LED row; a bypass circuit that is connected to part connecting the first partial LED row and the second partial LED row and that returns current from the first partial LED row to the rectifier circuit; and a current limiting circuit that limits the current flowing through the auxiliary LED row wherein the primary LED row and the auxiliary LED row are connected in parallel to the rectifier circuit; and the bypass circuit blocks the current passing through the bypass circuit in accordance with the current flowing through the primary LED row, and controls and blocks the current flowing through the auxiliary LED row.

8 Claims, 5 Drawing Sheets

(56) References Cited

U.S. PATENT DOCUMENTS

| | | |
|---|---|---|
| 2010/0207150 A1 | 8/2010 | Grajcar |
| 2011/0109244 A1* | 5/2011 | Grajcar .................. 315/294 |
| 2011/0193467 A1* | 8/2011 | Grajcar .................. 315/291 |

FOREIGN PATENT DOCUMENTS

| | | |
|---|---|---|
| JP | 2011-216758 A | 10/2011 |
| JP | 2012-009271 A | 1/2012 |
| WO | 2011/020007 A1 | 2/2011 |

* cited by examiner

LED DRIVE CIRCUIT

TECHNICAL FIELD

The present invention relates to an LED drive circuit, and more particularly to an LED drive circuit comprising as a light source an LED array constructed by connecting a plurality of LEDs (light-emitting diodes) in series.

BACKGROUND

An LED drive circuit is known which drives LEDs to emit light by applying a full-wave rectified waveform obtained from an AC commercial power supply directly to an LED array. The LED array here is a series connection of a plurality of LED arrays and is constructed to be able to withstand a high voltage. Compared with other types of LED drive circuits that drive LEDs to emit light by generating a constant voltage from an AC commercial power supply, the above LED drive circuit has the advantage that the circuit configuration is simple and compact.

However, if a full-wave rectified waveform is simply applied to an LED array, a problem occurs in which the LEDs light only during the periods when the full-wave rectified waveform exceeds the threshold value of the LED array. For example, when the forward voltage Vf of each LED is 3 V, and the LED array is constructed by connecting 40 such LEDs in series, the threshold value of the LED array is 120 V. Suppose that the rms value of the AC commercial power supply is 100 V; then, with the above LED drive circuit, the LEDs light only during short periods when the full-wave rectified waveform exceeds 120 V. As a result, with the above LED drive circuit, not only do the LEDs become dim or produce perceivable flicker, but the power factor and distortion factor also decrease.

To address this, it is known to provide methods for extending the LED ON period; in one known method, the LED array is divided into a number of LED sub-arrays, and provisions are made to turn on only some of the LED sub-arrays during the low voltage period of the full-wave rectified waveform and to increase the number of LED sub-arrays to be turned on as the voltage increases (refer to patent document 1).

Figure 4:
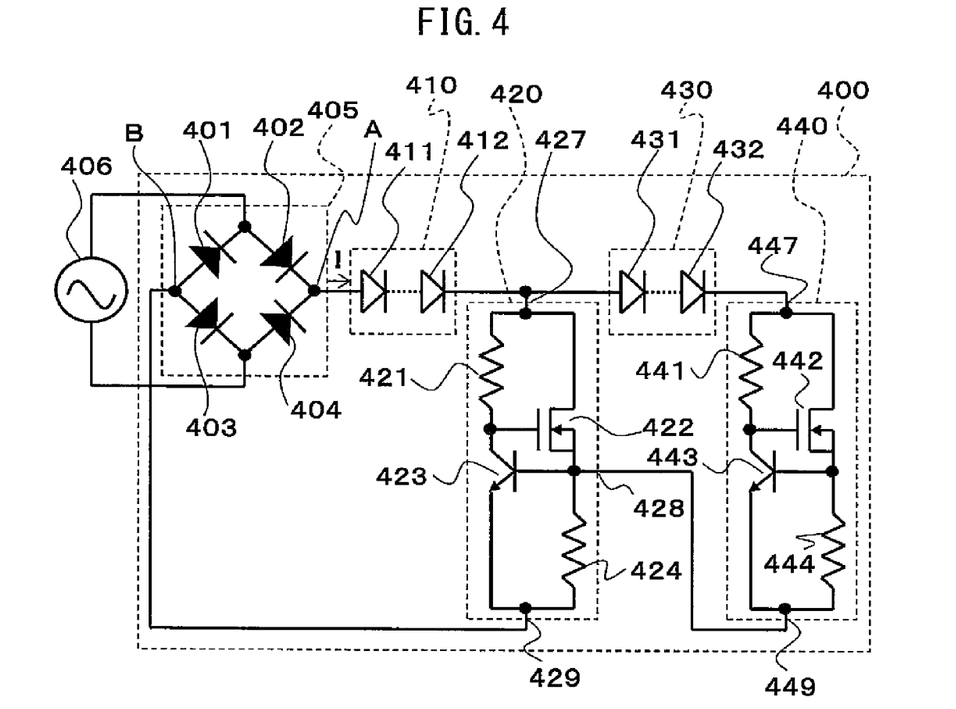
FIG. 4 is a circuit diagram showing one example of an LED drive circuit; the diagram is redrawn from FIG. 26 given in patent document 1 without departing from the purpose thereof.

FIG. 4 is a circuit diagram showing one example of an LED drive circuit; the diagram is redrawn from FIG. 26 given in patent document 1 without departing from the purpose thereof. In the diagram, the current-limiting resistor is replaced by a current-limiting circuit. Therefore, it should be noted that the LED drive circuit shown in FIG. 4 is given only for illustrative purposes and does not directly represent the LED drive circuit known in the art.

In the example of FIG. 4, a bypass circuit which turns on (conducts) during the low voltage period of the full-wave rectified waveform and turns off (does not conduct) during the high voltage period is connected to a connection node between each LED sub-array. The bypass circuit is controlled on and off according to the voltage value of the full-wave rectified waveform or the value of the current that flows through the LED array.

The LED drive circuit 400 shown in FIG. 4 comprises a diode bridge circuit 405, LED sub-arrays 410 and 430, a bypass circuit 420, and a current-limiting resistor 440. A commercial power supply 406 is connected to input terminals of the diode bridge circuit 405.

The bridge rectifier circuit 405 is constructed from four diodes 401, 402, 403, and 404, and has a terminal A as an output terminal for outputting a full-wave rectified waveform and a terminal B as a terminal for providing a reference voltage. The LED sub-array 410 is constructed from a series connection of a large number of LEDs including LEDs 411 and 412. Similarly, the LED sub-array 430 is constructed from a series connection of a large number of LEDs including LEDs 431 and 432. The bypass circuit 420 includes a pull-up resistor 421, a current-sensing resistor 424, a field-effect transistor (FET) 422, a bipolar transistor (hereinafter simply "transistor") 423, a first current input terminal 427, a second current input terminal 428, and a current output terminal 429. Similarly to the bypass circuit 420, the current-limiting circuit 440 includes a pull-up resistor 441, a current-sensing resistor 444, an FET 442, a transistor 443, a current input terminal 447, and a current output terminal 449. The FETs 422 and 442 are enhancement-mode n-type MOS-FETs.

FIG. 5(a) is a waveform diagram depicting a full-wave rectified waveform, and FIG. 5(b) is a waveform diagram depicting a circuit current I in the LED drive circuit 400. The same time axis is used for both FIGS. 5(a) and 5(b).

Figure 5:
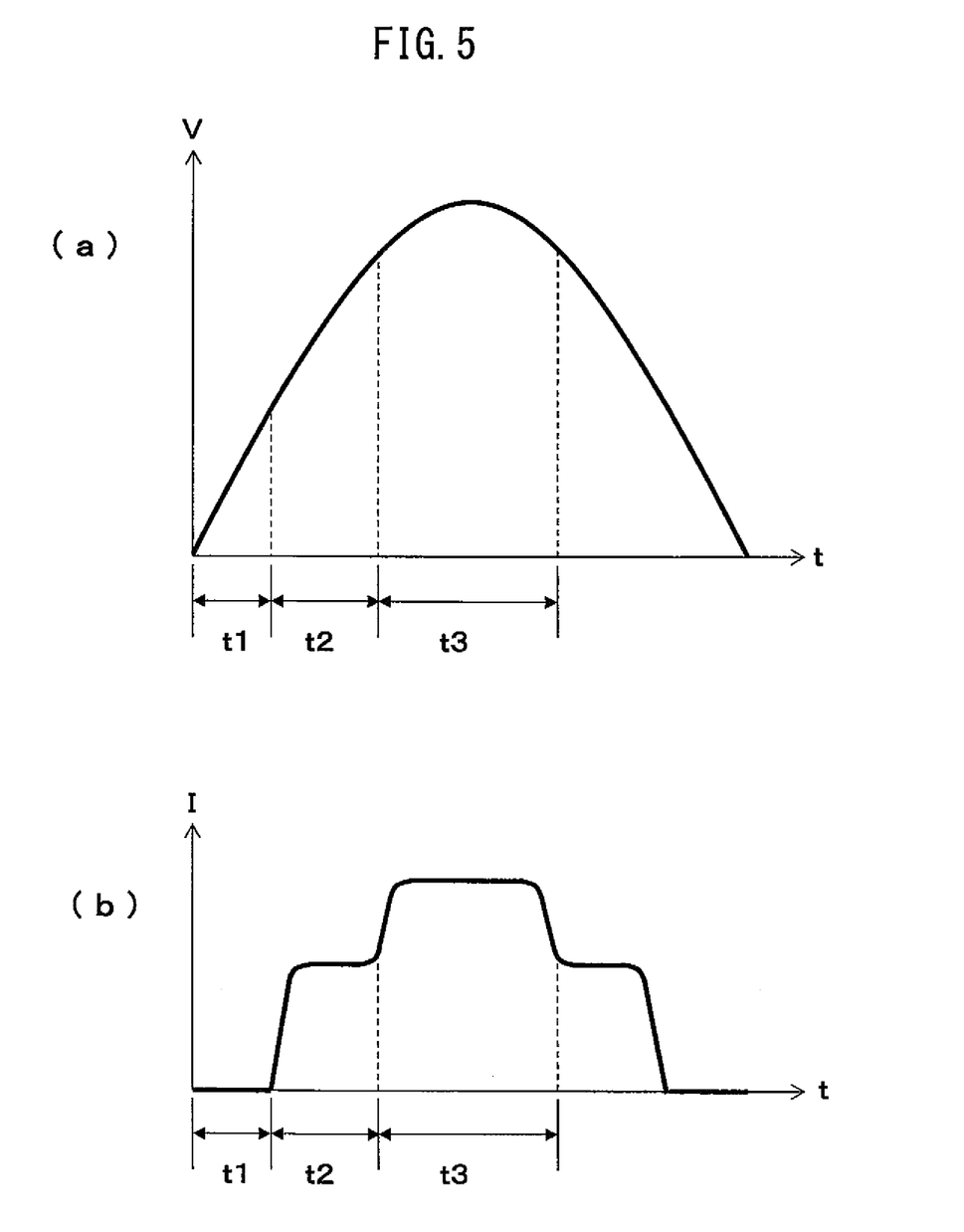

In FIG. 5, no circuit current I flows during the period t1 because the voltage value of the full-wave rectified waveform is smaller than the threshold value of the LED sub-array 410.

In the period t2, the voltage value of the full-wave rectified waveform exceeds the threshold value of the LED sub-array 410 but is smaller than the sum of the threshold value of the LED sub-array 410 and the threshold value of the LED sub-array 430. In this case, the circuit current I passes through the bypass circuit 420 and returns to the bridge rectifier circuit 405. During the period t2, feedback is applied so as to maintain the base-emitter voltage of the transistor 423 at 0.6 V, and the bypass circuit 420 thus operates in a constant current mode. Actually, in the last short portion of the period t2, the voltage value of the full-wave rectified waveform becomes slightly larger than the sum of the threshold value of the LED sub-array 410 and the threshold value of the LED sub-array 430, and a current flows in from the LED sub-array 430 via the current input terminal 428.

In the period t3, the voltage value of the full-wave rectified waveform exceeds the sum of the threshold value of the LED sub-array 410 and the threshold value of the LED sub-array 430, and the current flows to the current input terminal 428 by passing through the LED sub-array 430. At this time, the transistor 423 saturates, and the gate voltage of the FET 422 becomes equal to the reference voltage (the voltage at the terminal B), so that the FET 422 is cut off. As a result, the current flowing into the bypass circuit 420 via the current input terminal 427 rapidly drops. On the other hand, in the current-limiting circuit 440, feedback is applied so as to maintain the base-emitter voltage of the transistor 443 at 0.6 V, and the current-limiting circuit 440 thus operates in a constant current mode. The process that takes place during the period that the voltage of the full-wave rectified waveform falls is the reverse of the process that takes place during the period that the voltage of the full-wave rectified waveform rises.

PRIOR ART LITERATURE

Patent Literature

Patent document 1: WO2011020007

SUMMARY

However, in the LED drive circuit 400 shown in FIG. 4, compared with the current that flows during the high voltage period t3 (see FIG. 5) of the full-wave rectified waveform, the current that flows during the low voltage period t2 (see FIG.

5) is small, and the number of LEDs (LEDs 111, 112, etc.) turned on is also small; as a result, the brightness greatly decreases. Furthermore, since the proportions of the LED OFF period t1 (see FIG. 5) and the low voltage period t2 are large, motion breaks (a phenomenon in which a high-speed moving object appears to be moving discontinuously) become noticeable.

It is an object of the present invention to provide an LED drive circuit in which a simple circuit is added to increase emission brightness during the low voltage period of a full-wave rectified waveform.

There is provided an LED drive circuit includes, a rectifier circuit which outputs a full-wave rectified voltage waveform, a main light-emitting LED array which includes a first LED sub-array constructed by connecting a plurality of LEDs in series and a second LED sub-array constructed by connecting a plurality of LEDs in series, an auxiliary light-emitting LED array constructed by connecting a plurality of LEDs in series, a bypass circuit, connected to a connection node between the first LED sub-array and the second LED sub-array, for allowing a current passing through the first LED sub-array to return to the rectifier circuit, and a current-limiting circuit for limiting a current flowing through the auxiliary light-emitting LED array, and wherein the main light-emitting LED array and the auxiliary light-emitting LED array are connected in parallel with respect to the rectifier circuit, and the bypass circuit shuts off the current passing through the bypass circuit in accordance with the current flowing through the main light-emitting LED array, while also shutting off the current flowing to the auxiliary light-emitting LED array.

Preferably, in the LED drive circuit, the bypass circuit performs control so that the auxiliary light-emitting LED array turns on during a low voltage period of the full-wave rectified voltage waveform and turns off during a high voltage period of the full-wave rectified voltage waveform.

There is provided an LED drive circuit includes a main light-emitting LED array which is driven by a full-wave rectified voltage waveform, and which includes a first LED sub-array constructed by connecting a plurality of LEDs in series and a second LED sub-array constructed by connecting a plurality of LEDs in series, an auxiliary light-emitting LED array constructed by connecting a plurality of LEDs in series, a bypass circuit which includes a first current input terminal, a second current input terminal, and a first field-effect transistor, the first current input terminal being connected to a connection node between the first LED sub-array and the second LED sub-array, wherein the first field-effect transistor acts to limit the current flowing in via the first current input terminal in accordance with the current flowing in via the second current input terminal; and an auxiliary light-emitting circuit which includes a second field-effect transistor, and which causes the auxiliary light-emitting LED array to emit light, wherein the first field-effect transistor and the second field-effect transistor are chosen to have the same gate voltage.

The first field-effect transistor in the bypass circuit is used to control the current flowing in via the first current input terminal of the bypass circuit in accordance with the current flowing in via the second current input terminal. During the low voltage period of the full-wave rectified waveform, since no or little current flows in via the second current input terminal, the first field-effect transistor turns on, and the current flows in via the first current input terminal. On the other hand, during the high voltage period of the full-wave rectified waveform, since the current flowing in via the second current input terminal increases, the first field-effect transistor turns off, and the current no longer flows in via the first current input terminal. In the auxiliary light-emitting circuit, the second field-effect transistor whose gate voltage is equal to the gate voltage of the first field-effect transistor turns on during the low voltage period of the full-wave rectified waveform and turns off during the high voltage period. As a result, the auxiliary light-emitting LED array contained in the auxiliary light-emitting circuit emits light during the low voltage period of the full-wave rectified waveform.

Preferably, in the LED drive circuit, an anode of the auxiliary light-emitting LED array is connected to an anode of the first LED sub-array, and a cathode of the auxiliary light-emitting LED array is connected to a drain of the second field-effect transistor.

Preferably, in the LED drive circuit, the first field-effect transistor and the second field-effect transistor are enhancement-mode devices.

Preferably, in the LED drive circuit, the bypass circuit further includes a current output terminal, a bipolar transistor, a pull-up resistor, and a current-sensing resistor, one end of the pull-up resistor and a drain of the first field-effect transistor are connected to the first current input terminal, a gate of the first field-effect transistor and a collector of the bipolar transistor are connected to the other end of the pull-up resistor, a source of the first field-effect transistor, a base of the bipolar transistor, and one end of the current-sensing resistor are connected to the second current input terminal, and an emitter of the bipolar transistor and the other end of the current-sensing resistor are connected to the current output terminal.

Preferably, in the LED drive circuit, the first field-effect transistor and the second field-effect transistor are depletion-mode devices.

Preferably, in the LED drive circuit, the bypass circuit further includes a current output terminal and a current sensing resistor, a drain of the first field-effect transistor is connected to the first current input terminal, a source of the first field-effect transistor and one end of the current-sensing resistor are connected to the second current input terminal, and a gate of the first field-effect transistor and the other end of the current-sensing resistor are connected to the current output terminal.

In the LED drive circuit, since the gate voltage of the second field-effect transistor contained in the auxiliary light-emitting circuit is equal to the gate voltage of the first field-effect transistor contained in the bypass circuit, the gate voltage of the second field-effect transistor need not be provided separately, and thus the circuitry to be added can be simplified. Furthermore, in the LED drive circuit, the light emission of the auxiliary light-emitting circuit serves to increase the amount of light to be produced during the low voltage period of the full-wave rectified waveform.

BRIEF DESCRIPTION OF THE DRAWINGS

FIG. 5(*a*) is a waveform diagram depicting a full-wave rectified waveform, and FIG. 5(*b*) is a waveform diagram depicting a circuit current I in an LED drive circuit 400.

DESCRIPTION

An LED drive circuit will be described below with reference to the drawings. It will, however, be noted that the technical scope of the present invention is not limited by any particular embodiment described herein, but extends to the inventions described in the appended claims and their equivalents. Further, in the description of the drawings, the same or corresponding component elements are designated by the same reference numerals, and the description of such component elements, once given, will not be repeated thereafter.

Figure 1:
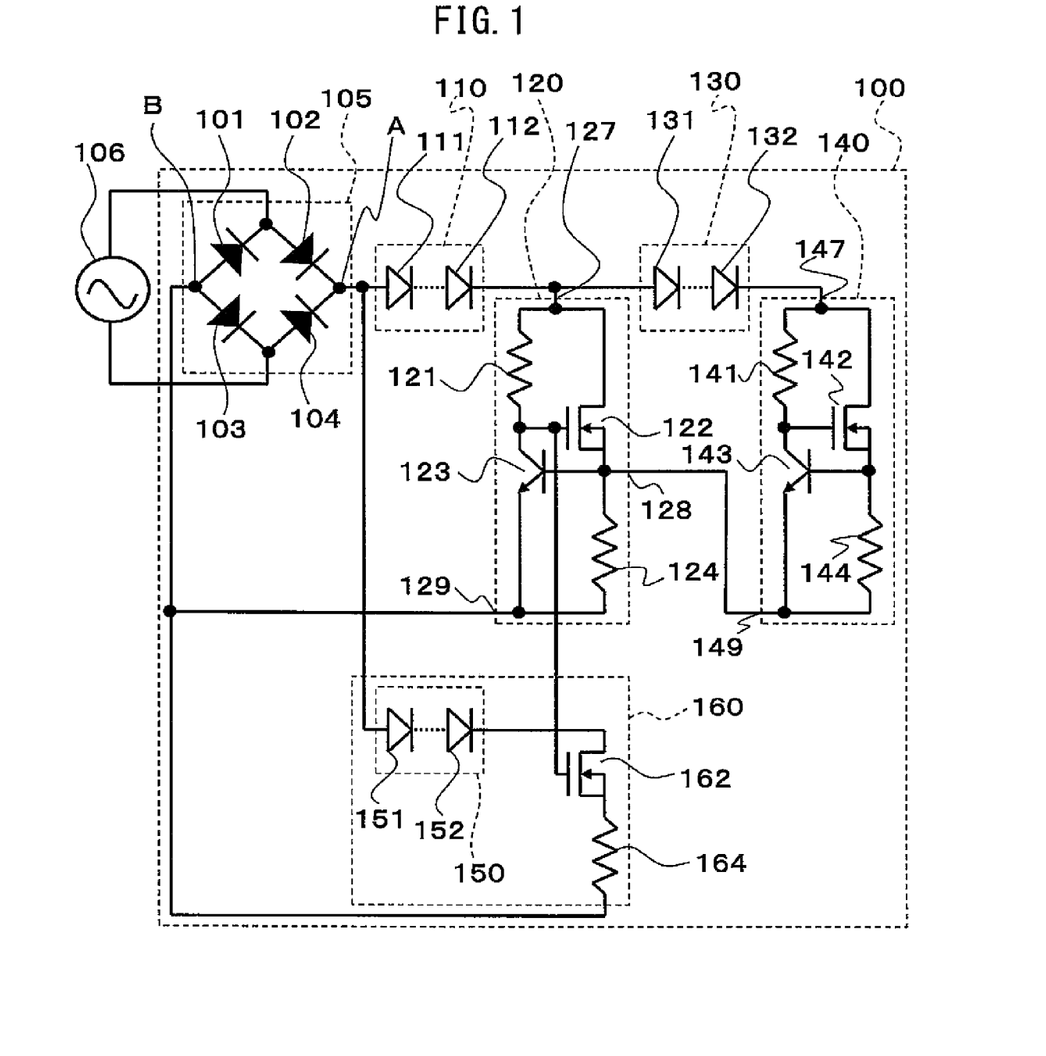
FIG. 1 is a circuit configuration diagram of an LED drive circuit 100.

FIG. 1 is a circuit configuration diagram of an LED drive circuit 100.

The LED drive circuit 100 comprises a bridge rectifier circuit 105, LED sub-arrays 110 and 130, a bypass circuit 120, a current-limiting circuit 140, and an auxiliary light-emitting circuit 160. An AC commercial power supply 106 is connected to input terminals of the bridge rectifier circuit 105.

The bridge rectifier circuit 105 is constructed from four diodes 101, 102, 103, and 104, and has a terminal A as an output terminal for outputting a full-wave rectified waveform and a terminal B as a terminal for providing a reference voltage. The LED array contained in the LED drive circuit 100 comprises two LED arrays, a main light-emitting LED array and an auxiliary light-emitting LED array. The LED sub-array 110 (first LED sub-array) and the LED sub-array 130 (second LED sub-array) constitute the main light-emitting LED array. The auxiliary light-emitting LED array is implemented as an auxiliary light-emitting LED array 150 in the auxiliary light-emitting circuit 160 to be described later. In the main light-emitting LED array, the LED sub-arrays 110 and 130 are connected in series. The LED sub-array 110 is constructed from a series connection of a large number of LEDs including LEDs 111 and 112. Similarly, the LED sub-array 130 is constructed from a series connection of a large number of LEDs including LEDs 131 and 132. The anode of the LED sub-array 110 is connected to the terminal A of the bridge rectifier circuit 105. The connection node between the LED sub-arrays 110 and 130 is connected to a current input terminal 127 (first current input terminal) of the bypass circuit 120. The cathode of the LED sub-array 130 is connected to a current input terminal 147 of the current-limiting circuit 140.

The bypass circuit 120 includes, in addition to the current input terminal 127 (first current input terminal), a current input terminal 128 (second current input terminal) and a current output terminal 129. The current input terminal 128 is connected to a current output terminal 149 of the current-limiting circuit 140. The current output terminal 129 is connected to the terminal B of the bridge rectifier circuit 105. The bypass circuit 120 is configured so that the current flowing in via the current input terminal 127 is limited in accordance with the current flowing in via the current input terminal 128.

The bypass circuit 120 comprises a pull-up resistor 121, a current-sensing resistor 124, a field-effect transistor (first field-effect transistor) 122, and a bipolar transistor (hereinafter simply "transistor") 123. One end of the pull-up resistor 121 and the drain of the FET 122 are connected to the current input terminal 127. The other end of the pull-up resistor 121 is connected to the gate of the FET 122 and the collector of the transistor 123. The source of the FET 122, the base of the transistor 123, and one end of the current-sensing resistor 124 are connected to the current input terminal 128. The emitter of the transistor 123 and the other end of the current-sensing resistor 124 are connected to the current output terminal 129.

The current-limiting circuit 140 differs from the bypass circuit 120 only by the absence of the second current input terminal (the terminal that corresponds to the current input terminal 128 of the bypass circuit 120). In the current-limiting circuit 140, the connections of the pull-up resistor 141, the current-sensing resistor 144, the FET 142, and the transistor 143 are the same as those of the corresponding components in the bypass circuit 120. The resistance value of the current-sensing resistor 144 is set smaller than that of the current-sensing resistor 124.

The auxiliary light-emitting circuit 160 comprises an FET 162 and a resistor 164 in addition of the auxiliary light-emitting LED array 150. The auxiliary light-emitting LED array 150 is constructed from a series connection of a large number of LEDs including LEDs 151 and 152, and its anode is connected to the anode of the LED sub-array 110, while its cathode is connected to the drain of the FET 162. The number of series-connected stages in the auxiliary light-emitting LED array 150 is set equal to the number of series-connected stages in the LED sub-array 110 so that the threshold value becomes the same for both. The gate of the FET 162 is connected to the gate of the FET 122 in the bypass circuit 120, while the source of the FET 162 is connected to one end of the resistor 164. The other end of the resistor 164 is connected to the terminal B of the bridge rectifier circuit 105.

The FETs 122, 142, and 162 are enhancement-mode n-type MOS-FETs.

Figure 2:
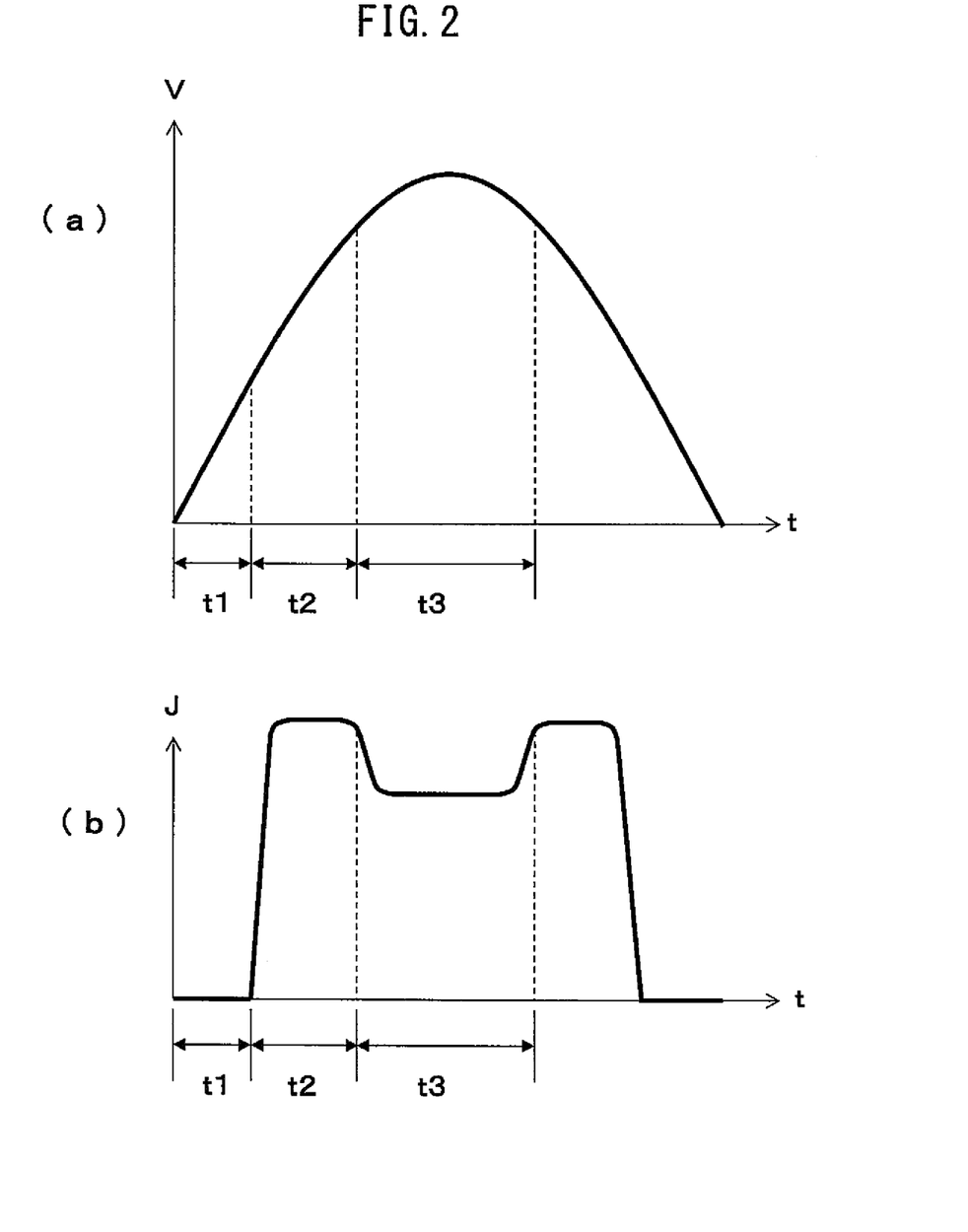
FIG. 2(a) is a waveform diagram depicting a full-wave rectified waveform.
FIG. 2(b) is a waveform diagram depicting a circuit current J in the LED drive circuit 100.

FIG. 2(*a*) is a waveform diagram depicting a full-wave rectified waveform, and FIG. 2(*b*) is a waveform diagram depicting a circuit current J in the LED drive circuit 100. The circuit current J indicates the current that flows out from the terminal A of the bridge rectifier circuit 105 toward the LED sub-array 110. The same time axis is used for both FIGS. 2(*a*) and 2(*b*).

In FIG. 2, no circuit current J flows during the period t1 because the voltage value of the full-wave rectified waveform is smaller than the threshold value of the LED sub-array 110 and the auxiliary light-emitting LED array 150.

In the period t2, the voltage value of the full-wave rectified waveform exceeds the threshold value of the LED sub-array 110 and the auxiliary light-emitting LED array 150 but is smaller than the sum of the threshold value of the LED sub-array 110 and the threshold value of the LED sub-array 130. In this case, a portion of the circuit current J passes through the bypass circuit 120 and returns to the bridge rectifier circuit 105. During the period t2, feedback is applied so as to maintain the base-emitter voltage of the transistor 123 at 0.6 V, and the bypass circuit 120 thus operates in a constant current mode. The remaining portion of the circuit current J passes through the auxiliary light-emitting LED array 150 and flows through the FET 162, and returns to the bridge rectifier circuit 105. Since the FET 122 is operating in a constant current mode, the FET 162 also operates in a constant current mode. The amount of current to be diverted to the auxiliary light-emitting LED array 150 is determined by adjusting the value of the resistor 164 and the die size of the FET 162.

In this way, the circuit current J that flows during the period t2 is the sum of the current that flows through the LED sub-array 110 and the current that flows through the auxiliary light-emitting LED array 150, and thus becomes large as depicted in FIG. 2(*b*). For example, if it is assumed that the number of LEDs in the LED sub-array 110 is the same as that in the auxiliary light-emitting LED array 150, and that the die sizes of the FETs 122 and 162 and the values of the resistors 124 and 164 are respectively the same, the current that flows through the auxiliary light-emitting LED array 150 is approximately the same as the current that flows through the LED sub-array 110. That is, the amount of current approximately twice the amount of current that flows through the LED sub-array 110 flows during the period t2.

In the period t3, the voltage value of the full-wave rectified waveform exceeds the sum of the threshold value of the LED sub-array 110 and the threshold value of the LED sub-array 130, and the current flows to the current input terminal 128 by passing through the LED sub-array 130. At this time, the transistor 123 saturates, and the gate voltage of the FET 122 becomes equal to the reference voltage (the voltage at the terminal B), so that the FET 122 is cut off. At the same time, the FET 162 is also cut off. As a result, the circuit current J flows only through the LED sub-arrays 110 and 130. The circuit current J is held constant by the current-limiting circuit 140.

The process that takes place during the period that the voltage of the full-wave rectified waveform falls is the reverse of the process that takes place during the period that the voltage of the full-wave rectified waveform rises. Further, the LED drive circuit 100 is set up so that the circuit current J that flows during the low voltage period (the period t2) of the full-wave rectified waveform is larger than the circuit current J that flows during the high voltage period (the period t3) of the full-wave rectified waveform.

As described above, in the LED drive circuit 100, the main light-emitting LED array and the auxiliary light-emitting LED array 150 are connected in parallel with respect to the rectifier circuit 105 and, during the period t2, only the LED sub-array 110 and auxiliary light-emitting LED array 150 connected in parallel with respect to the rectifier circuit 105 are caused to emit light. In the period t3, the bypass circuit 120 shuts off the current returning to the rectifier circuit 105 via the bypass circuit 120, while also shutting off the current flowing to the auxiliary light-emitting LED array 150 by controlling the auxiliary light-emitting circuit 160. As a result, during the period t3, only the LED sub-array 110 and 130 connected in series to the rectifier circuit 105 are caused to emit light. In this way, the LED drive circuit 100 performs control so that, during the low voltage period of the full-wave rectified waveform, the two LED arrays connected in parallel with respect to the rectifier circuit 105 are caused to emit light and, during the high voltage period of the full-wave rectified waveform, the two LED arrays connected in series to the rectifier circuit 105 are caused to emit light. The above configuration is the same for the alternative LED drive circuit 300 described hereinafter.

Figure 3:
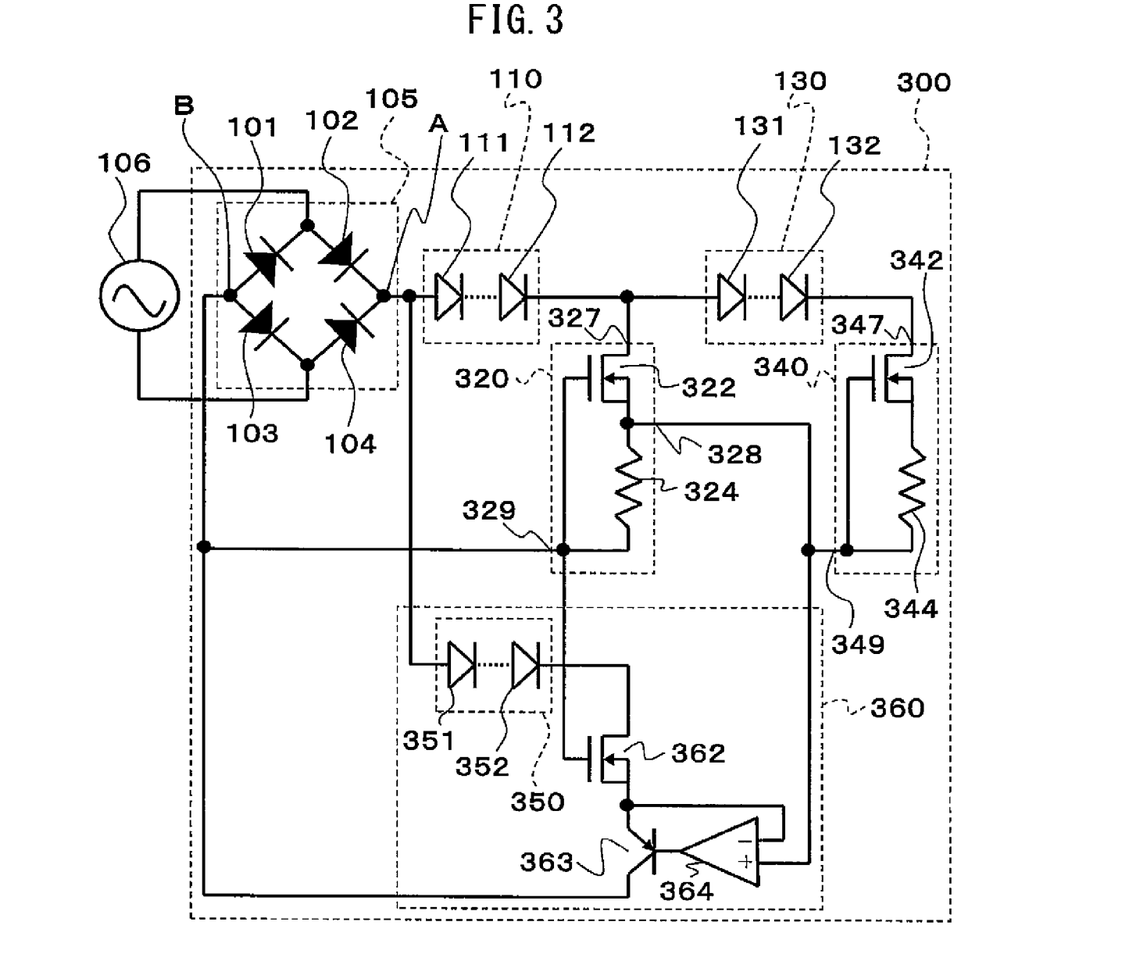
FIG. 3 is a circuit configuration diagram of an alternative LED drive circuit 300.

FIG. 3 is a circuit configuration diagram of the alternative LED drive circuit 300.

The FETs 122 and 142 used in the bypass circuit 120 and current-limiting circuit 140 shown in FIG. 1 were enhancement-mode FETs; however, if depletion-mode FETs were used instead, the bypass circuit and the current-limiting circuit could be simplified while accomplishing equivalent functions. FIG. 3 shows the LED drive circuit 300 using depletion-mode FETs.

The LED drive circuit 300 comprises a bridge rectifier circuit 105, LED sub-arrays 110 and 130, a bypass circuit 320, a current-limiting circuit 340, and an auxiliary light-emitting circuit 360. The bridge rectifier circuit 105 and the LED sub-arrays 110 and 130 are the same as those in the LED drive circuit 100 of FIG. 1, and the AC commercial power supply 106 is connected to the input terminals of the bridge rectifier circuit 105.

The LED array contained in the LED drive circuit 300 comprises two LED arrays, a main light-emitting LED array and an auxiliary light-emitting LED array. The LED sub-array 110 (first LED sub-array) and the LED sub-array 130 (second LED sub-array) constitute the main light-emitting LED array. The auxiliary light-emitting LED array is implemented as an auxiliary light-emitting LED array 350 in the auxiliary light-emitting circuit 360 to be described later. The anode of the LED sub-array 110 is connected to the terminal A of the bridge rectifier circuit 105, the connection node between the LED sub-arrays 110 and 130 is connected to a current input terminal 327 (first current input terminal) of the bypass circuit 320, and the cathode of the LED sub-array 130 is connected to a current input terminal 347 of the current-limiting circuit 340.

The bypass circuit 320 includes, in addition to the current input terminal 327 (first current input terminal), a current input terminal 328 (second current input terminal) and a current output terminal 329. The current input terminal 328 is connected to a current output terminal 349 of the current-limiting circuit 340. The current output terminal 329 is connected to the terminal B of the bridge rectifier circuit 105. The bypass circuit 320 is configured so that the current flowing in via the current input terminal 327 is limited in accordance with the current flowing in via the current input terminal 328.

The bypass circuit 320 comprises a field-effect transistor (first field-effect transistor) 322 and a current-sensing resistor 324. The drain of the FET 322 is connected to the current input terminal 327. The source of the FET 322 and one end of the current-sensing resistor 324 are connected to the current input terminal 328. The gate of the FET 322 and the other end of the current-sensing resistor 324 are connected to the current output terminal 329.

The circuit configuration of the current-limiting circuit 340 is substantially the same as that of the bypass circuit 320, the only difference being the absence of the second current input terminal (the terminal that corresponds to the current input terminal 328 of the bypass circuit 320). The connections of the FET 342 and the current-sensing resistor 344 are the same as those of the corresponding components in the bypass circuit 320. The resistance value of the current-sensing resistor 344 is smaller than that of the current-sensing resistor 324.

The FETs 322 and 342 are depletion-mode n-type MOSFETs. In the depletion-mode FET, the drain current Id has a negative threshold value and the gate voltage Vg must be made sufficiently lower than the source voltage Vs in order to turn off the FET. However, since the drain current Id has a negative threshold value, the bypass circuit 320 whose configuration is simplified by omitting the resistor 121 and transistor 123 from the bypass circuit 120 shown in FIG. 1 can be made to operate in a constant current mode in the same manner as the bypass circuit 120. For example, in the bypass circuit 320, when the drain current Id of the FET 322 increases, the voltage drop across the resistor 324 increases, and as a result, the current flowing between the source and drain of the FET 322 decreases. Conversely, in the bypass circuit 320, when the drain current Id of the FET 322 decreases, the voltage drop across the resistor 324 decreases, and as a result, the current flowing between the source and drain of the FET 322 increases. That is, the drain current Id and the current flowing between the source and drain form a negative feedback loop. On the other hand, in the case of the enhancement-mode FET, since the drain current Id has a positive threshold value, a transistor has to be added in order to form such a negative feedback loop.

The auxiliary light-emitting circuit 360 comprises an FET 362, a PNP transistor 363, and an operational amplifier 364, in addition of the auxiliary light-emitting LED array 350. The FET 362 is a depletion-mode n-type MOS-FET. The auxiliary light-emitting LED array 350 is constructed from a series connection of a large number of LEDs including LEDs 351 and 352. The anode of the auxiliary light-emitting LED array 350 is connected to the anode of the LED sub-array 110, and the cathode of the auxiliary light-emitting LED array 350 is connected to the drain of the FET 362. The number of series-connected stages in the auxiliary light-emitting LED array 350 is set equal to the number of series-connected stages in the LED sub-array 110 so that the threshold value becomes the same for both. The gate of the FET 362 is connected to the gate of the FET 322 in the bypass circuit 320, while the source of the FET 362 is connected to the emitter of the transistor 363 as well as to the negative input terminal of the operational amplifier 364. The output terminal of the operational amplifier 364 is connected to the base of the transistor 363, and the collector of the transistor 363 is connected to the terminal B of the bridge rectifier circuit 105.

Next, the operation of the LED drive circuit 300 will be described with reference to FIG. 2. The waveform diagrams of FIGS. 2(*a*) and 2(*b*) also apply to the LED drive circuit 300. The circuit current J in the LED drive circuit 300 also indicates the current that flows out from the terminal A of the bridge rectifier circuit 105 toward the LED sub-array 110.

No circuit current J flows during the period t1 because the voltage value of the full-wave rectified waveform is smaller than the threshold value of the LED sub-array 110 and the auxiliary light-emitting LED array 350.

In the period t2, the voltage value of the full-wave rectified waveform exceeds the threshold value of the LED sub-array 110 and the auxiliary light-emitting LED array 350 but is smaller than the sum of the threshold value of the LED sub-array 110 and the threshold value of the LED sub-array 130. In this case, a portion of the circuit current J passes through the bypass circuit 320 and returns to the bridge rectifier circuit 105. During the period t2, feedback is applied from the current-sensing resistor 324 to the source of the FET 322, and the bypass circuit 320 thus operates in a constant current mode. The remaining portion of the circuit current J passes through the auxiliary light-emitting LED array 350 and flows through the FET 362, and returns to the bridge rectifier circuit 105. Since the FET 322 is operating in a constant current mode, the FET 362 also operates in a constant current mode.

The operational amplifier 364 and the transistor 363 are inserted so that the source voltage of the FET 322 becomes equal to the source voltage of the FET 362. If the current supply capability of the operational amplifier 364 is large, the transistor 363 may be omitted. The amount of current to be diverted to the auxiliary light-emitting LED array 350 is determined by adjusting the die size of the FET 362. In this way, the circuit current J that flows during the period t2 is the sum of the current that flows through the LED sub-array 110 and the current that flows through the auxiliary light-emitting LED array 350, and thus becomes large as depicted in the figure.

In the period t3, the voltage value of the full-wave rectified waveform exceeds the sum of the threshold value of the LED sub-array 110 and the threshold value of the LED sub-array 130, and the current flows to the current input terminal 328 by passing through the LED sub-array 130. At this time, the source voltage of the FET 322 increases, thus increasing the source-to-gate voltage of the FET 322, so that the FET 322 is cut off. At the same time, the FET 362 is also cut off. As a result, the circuit current J flows only through the LED sub-arrays 110 and 130. The circuit current J is held constant by the current-limiting circuit 340.

The process that takes place during the period that the voltage of the full-wave rectified waveform falls is the reverse of the process that takes place during the period that the voltage of the full-wave rectified waveform rises. Further, the LED drive circuit 300 is set up so that the circuit current that flows during the low voltage period (the period t2) of the full-wave rectified waveform is larger than the circuit current that flows during the high voltage period (the period t3) of the full-wave rectified waveform.

While the LED drive circuits 100 and 300 have each been described as being constructed using the current-limiting circuit 140 or 340, a current-limiting resistor or a constant-current diode may be used instead of the current-limiting circuit. However, compared with the current-limiting resistor, using the constant-current circuit offers the further advantage of being able to ensure relatively stable operation even when the amplitude of the AC commercial power supply is unstable.

In the LED drive circuits 100 and 300, the main light-emitting LED array is constructed from two LED sub-arrays (the LED sub-arrays 110 and 130), and the bypass circuit 120, 320 and the current-limiting circuit 140, 340 are identical in configuration, except for the current input terminal (second current input terminal) 128, 328. In view of this, in the case of the LED drive circuit 100, a block may be constructed from a combination of the LED sub-array 110 and the bypass circuit 120, and a number of such blocks may be cascaded in a multistage configuration. In this case, the bypass circuit 120 is connected to the connection node between each LED sub-array and, between any two adjacent bypass circuits 120, the current input terminal (second current input terminal) 128 is connected to the current output terminal 129. By thus cascading the blocks in a multistage configuration, it becomes easier to increase brightness and improve distortion factor. Further, in this case, the resistance values of the current-limiting resistors contained in the respective blocks must be set in such a manner that the current-limiting resistor contained in a block farther away from the bridge rectifier circuit 105 has a smaller resistance value. In the LED drive circuit 300 also, such blocks can be cascaded in a multistage configuration.

DESCRIPTION OF REFERENCE NUMERALS

100, 300 . . . LED DRIVE CIRCUIT
101, 102, 103, 104 . . . DIODE
105 . . . BRIDGE RECTIFIER CIRCUIT
106 . . . AC COMMERCIAL POWER SUPPLY
110 . . . LED SUB-ARRAY (FIRST LED SUB-ARRAY)
111, 112, 131, 132, 151, 152, 351, 352 . . . LED
102, 320 . . . BYPASS CIRCUIT
121, 141 . . . PULL-UP RESISTOR
122 . . . FET (FIRST ENHANCEMENT-MODE FIELD-EFFECT TRANSISTOR)
123, 143 . . . TRANSISTOR (BIPOLAR TRANSISTOR)
124, 144, 324, 344 . . . CURRENT-SENSING RESISTOR
127, 327 . . . CURRENT INPUT TERMINAL (FIRST CURRENT INPUT TERMINAL)
128, 328 . . . CURRENT INPUT TERMINAL (SECOND CURRENT INPUT TERMINAL)
129, 329 . . . CURRENT OUTPUT TERMINAL
130 . . . LED SUB-ARRAY (SECOND LED SUB-ARRAY)
142 . . . FET (ENHANCEMENT-MODE FIELD-EFFECT TRANSISTOR)
150, 350 . . . AUXILIARY LIGHT-EMITTING LED ARRAY
160, 360 . . . AUXILIARY LIGHT-EMITTING CIRCUIT
162 . . . FET (SECOND ENHANCEMENT-MODE FIELD-EFFECT TRANSISTOR)

164 ... RESISTOR
322 ... FET (FIRST DEPLETION-MODE FIELD-EFFECT TRANSISTOR)
342 ... FET (DEPLETION-MODE FIELD-EFFECT TRANSISTOR)
362 ... FET (SECOND DEPLETION-MODE FIELD-EFFECT TRANSISTOR)
363 ... TRANSISTOR (PNP BIPOLAR TRANSISTOR)
364 ... OPERATIONAL AMPLIFIER

What is claimed is:

1. An LED drive circuit comprising:
a rectifier circuit which outputs a full-wave rectified voltage waveform;
a main light-emitting LED array which includes a first LED sub-array constructed by connecting a plurality of LEDs in series and a second LED sub-array constructed by connecting a plurality of LEDs in series, wherein said first LED sub-array and said second LED sub-array are connected in series away from said rectifier circuit;
an auxiliary light-emitting LED array constructed by connecting a plurality of LEDs in series;
a bypass circuit, connected to a connection node between said first LED sub-array and said second LED sub-array, for allowing a current passing through said first LED sub-array to return to said rectifier circuit; and
a current-limiting circuit for limiting a current flowing through said auxiliary light-emitting LED array,
wherein said main light-emitting LED array and said auxiliary light-emitting LED array are connected in parallel with respect to said rectifier circuit, and
said bypass circuit shuts off the current flowing in via said connection node when the current passing through said second LED sub-array exceeds a predetermined value, while also shutting off the current flowing to said auxiliary light-emitting LED array.

2. The LED drive circuit according to claim 1, wherein said bypass circuit performs control so that said auxiliary light-emitting LED array turns on during a low voltage period of said full-wave rectified voltage waveform and turns off during a high voltage period of said full-wave rectified voltage waveform.

3. The LED drive circuit according to claim 1, wherein said bypass circuit includes a first current input terminal, a second current input terminal, and a first field-effect transistor, said first current input terminal being connected to the connection node between said first LED sub-array and said second LED sub-array, wherein said first field-effect transistor acts to limit the current flowing in via said first current input terminal in accordance with the current flowing in via said second current input terminal, and wherein said current-limiting circuit includes a second field-effect transistor, and said first field-effect transistor and said second field-effect transistor are chosen to have the same gate voltage.

4. The LED drive circuit according to claim 3, wherein an anode of said auxiliary light-emitting LED array is connected to an anode of said first LED sub-array, and a cathode of said auxiliary light-emitting LED array is connected to a drain of said second field-effect transistor.

5. The LED drive circuit according to claim 3, wherein said first field-effect transistor and said second field-effect transistor are enhancement-mode devices.

6. The LED drive circuit according to claim 5, wherein said bypass circuit further includes a current output terminal, a bipolar transistor, a pull-up resistor, and a current-sensing resistor, one end of said pull-up resistor and a drain of said first field-effect transistor are connected to said first current input terminal, a gate of said first field-effect transistor and a collector of said bipolar transistor are connected to the other end of said pull-up resistor, a source of said first field-effect transistor, a base of said bipolar transistor, and one end of said current-sensing resistor are connected to said second current input terminal, and an emitter of said bipolar transistor and the other end of said current-sensing resistor are connected to said current output terminal.

7. The LED drive circuit according to claim 3, wherein said first field-effect transistor and said second field-effect transistor are depletion-mode devices.

8. The LED drive circuit according to claim 7, wherein said bypass circuit further includes a current output terminal and a current sensing resistor, a drain of said first field-effect transistor is connected to said first current input terminal, a source of said first field-effect transistor and one end of said current-sensing resistor are connected to said second current input terminal, and a gate of said first field-effect transistor and the other end of said current-sensing resistor are connected to said current output terminal.

* * * * *